B. F. JOHNSON.
PROCESS OF PRESERVING CORN.
APPLICATION FILED APR. 29, 1911.
1,004,033.
Patented Sept. 26, 1911.
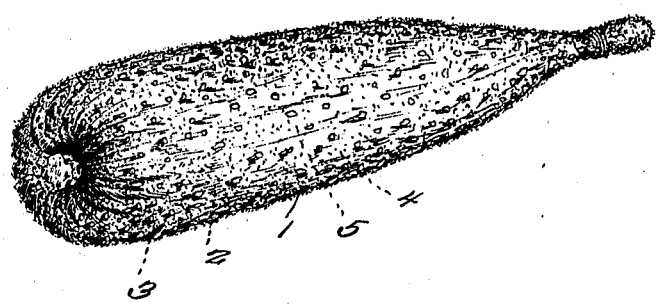
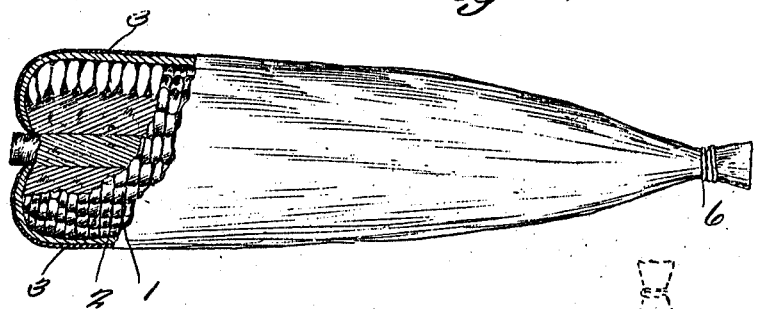
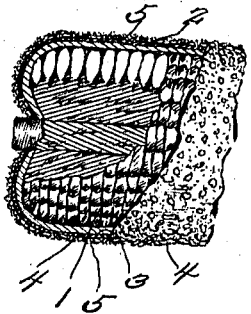
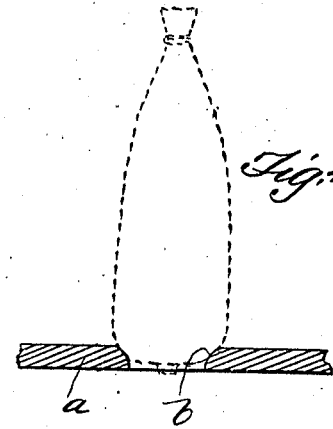
Witnesses
Inventor
B. F. Johnson,
By D. Swift & Co.
Attorneys

UNITED STATES PATENT OFFICE.

BENJAMIN F. JOHNSON, OF MACCLENNY, FLORIDA.

PROCESS OF PRESERVING CORN.

1,004,033.  Specification of Letters Patent. Patented Sept. 26, 1911.

Application filed April 29, 1911. Serial No. 624,165.

*To all whom it may concern:*

Be it known that I, BENJAMIN F. JOHNSON, a citizen of the United States, residing at Macclenny, in the county of Baker and State of Florida, have invented a new and useful Process of Preserving Corn; and I do hereby declare the following to be a full, clear, and exact description of the invention, such as will enable others skilled in the art to which it appertains to make and use the same.

This invention relates to a new and useful process for preserving ears of corn while in the husks, and protecting the same against insects, rats and mice, as well as the weevil.

The invention in its broadest scope aims as its primary object to provide a method for hermetically sealing ears of corn within their husks, thus shielding and protecting the corn against insects, rats, mice and the weevil.

The invention comprises further features and combination of steps in the process, as hereinafter set forth, disclosed in the drawings, and claimed.

In the drawings:—Figure 1 is a view in perspective showing an ear of corn with the husk thereon, the same being provided with a coating of tar, lime, (preferably air slaked) and dust, such as sawdust and the like. Fig. 2 is a sectional view, showing a coating of tar, which is the first coating, as applied on the husk. Fig. 3 is a view similar to Fig. 2, illustrating the fact that the husk is further supplied with a coating of lime and sawdust. Fig. 4 is a detail view, showing the drain board 2, with the depression *b* with the corn shown in dotted line as supported thereby.

Referring more particularly to the drawings, 1 designates the ear of corn, while 2 denotes the husk. This husk is supplied first with a coating of tar 3, then a layer of any suitable dust, such as sawdust or the like 4, and finally supplied with a layer or thin coating of lime 5.

The steps of the process or method are hereinafter related as follows: The husk about the corn is first tied by a suitable string or twine 6, at any suitable location beyond the small end of the ear of corn, after which the end of the husks beyond the twine or string, is severed, as shown clearly in Fig. 1. After the husk has been thus tied, the same with the corn on the inside is submerged within a quantity of running tar, for instance, pine tar, which has been brought to a heat of 60 or 70 degrees centigrade, in order that only a thin layer of coating of tar will adhere to the husk, for it will only take a small amount to properly glaze the husk. After the husk has been supplied with the proper coating of tar the same is then placed upon a drain board or a table for approximately two hours, to permit the tar to drain to the proper thickness, and to dry to the proper consistency. The husk is subsequently thrown into a box of dust, such as sawdust and the like, and agitated until a thin covering of dust adheres to the tar. As the final step, the husk is then submerged in a lime box (not shown), the lime of which being air slaked, so that a thin layer of lime will adhere to the tar and dust. The tar acts as a medium for hermetically sealing the husk, while the sawdust, provides a roughened surface, in the crevices of which the lime adheres to the tar. The sawdust acts as a base or a body for the lime, while the lime acts as a disinfectant. The pine tar in addition to its aforesaid features relative to the process, also acts as a disinfectant, especially in conjunction with the lime. After the husk has been thus coated, the same together with the ear of corn upon the inside is stored away, until the early spring, at which time the hermetically sealed husk is broken, and the corn is utilized for planting, thus rendering it possible to reap an excellent crop of corn.

It has been found through experience that one gallon of pine tar is sufficient to glaze or coat 4 bushels of corn, while approximately a half a barrel of dust (which is free for the gathering or the hauling of the same away) is sufficient to be supplied to the same amount of corn, whereas one barrel of air slake lime will be ample to supply the final finish upon the husk. It has further been discovered that two workmen can prepare 25 bushels of corn a day.

Instead of a plain, ordinary table or drain board *a*, a board *a* having a depression *b* such as shown at *b* in Fig. 4 of the drawings may be provided, so that the ears of corn may be stood upon their butts within the depression, so that the tar when first supplied may drain off the husks longitudinally thereof.

From the foregoing, it will be manifest that there has been devised or schemed a novel method for inexpensively hermetically sealing corn husks with their ears of corn on the inside so as to protect and shield the corn against rats, mice and various insects, such as weevils. Furthermore, it has been found that this process or method is practicable, and exceedingly simple to work.

The invention having been set forth, what is claimed as new and useful is:

1. A method for protecting and shielding corn with the husk thereon, which consists first in submerging the same in tar, then supplying a coating of dust, and finally submerging the whole within the lime.

2. A method for hermetically sealing corn husks while on the ear of corn, which first consists in submerging it within pine tar in a liquid state, then submerging the same in a quantity of sawdust, and finally submerging the whole in air-slaked lime.

3. A process or method for hermetically sealing corn husks while on the ear of corn, which first consists in submerging it in pine tar, in a running liquid state, the same having been brought to a heat of 60 to 70 degrees centigrade, then permitting the tar to drain and dry for a period of time, then submerging the tar coated article within a quantity of dust, and finally plunging the same into air slaked lime.

4. A method for hermetically sealing corn husks while on the ear of corn, which first consists in binding it beyond the small end of the cob with twine and severing the ends of same beyond the twine, then submerging it in pine tar in a running liquid state, brought to a heat of 60 to 70 degrees centigrade, then submerging the tar coated article in granulated material, and finally plunging the whole into air slaked lime.

5. A method for hermetically sealing a corn husk while on the ear of corn, which first consists in tying it beyond the small end of the cob and severing the end of same therebeyond, then submerging it in pine tar in a running liquid state, brought to a heat of 60 to 70 degrees centigrade, then permitting the tar to drain and dry for a period of approximately two hours, then submerging the tar coated article in sawdust and finally submerging the whole in air slaked lime.

In testimony whereof I have signed my name to this specification in the presence of two subscribing witnesses.

BENJAMIN F. JOHNSON.

Witnesses:
J. R. RHODES,
E. M. GOODBREAD.

---

Copies of this patent may be obtained for five cents each, by addressing the "Commissioner of Patents, Washington, D. C."